United States Patent [19]

Ando et al.

[11] Patent Number: 4,811,267

[45] Date of Patent: Mar. 7, 1989

[54] DIGITAL SIGNAL PROCESSOR WITH ADDRESSABLE AND SHIFTING MEMORY

[75] Inventors: Hideki Ando; Harufusa Kondo; Hirohisa Machida, all of Hyogo, Japan

[73] Assignee: Mitsubishi Denki Kabushiki Kaisha, Tokyo, Japan

[21] Appl. No.: 162,306

[22] Filed: Feb. 29, 1988

Related U.S. Application Data

[63] Continuation-in-part of Ser. No. 921,151, Oct. 21, 1984, abandoned.

[30] Foreign Application Priority Data

Oct. 23, 1985 [JP] Japan ................................ 60-238831

[51] Int. Cl.[4] .............................................. G06F 7/38
[52] U.S. Cl. ...................................... 364/736; 377/64; 364/900
[58] Field of Search ... 364/200 MS File, 900 MS File, 364/736, 715, 716; 365/189, 233, 242; 377/64, 70, 77, 78, 81

[56] References Cited

U.S. PATENT DOCUMENTS

| | | | |
|---|---|---|---|
| 4,468,786 | 8/1984 | Davis | 364/724 X |
| 4,491,910 | 1/1985 | Caudel et al. | 364/200 |
| 4,533,992 | 8/1985 | Magar et al. | 364/200 |
| 4,612,625 | 9/1986 | Bertrand | 364/724 |
| 4,617,676 | 10/1986 | Jayant et al. | 381/31 X |

OTHER PUBLICATIONS

IBM Tech. Discl. Bull. vol. 18, No. 10, Mar. 1976, "Shift Register Implemented by Indexing a Random-Access Memory" by Estéban.

*Primary Examiner*—Eddie P. Chan
*Attorney, Agent, or Firm*—Lowe, Price, LeBlanc, Becker & Shur

[57] ABSTRACT

A digital signal processor includes a digital memory, a controller, an arithmetic operation unit and an interconnecting bus. The memory includes a shift register having an addressable output for storing values which are supplied to a multiplier circuit of the arithmetic operation unit. Use of the shift register provides a data delay minimizing the number of instructions required to implement delay processing. In the arithmetic operation unit, the output from the multiplier is connected to an arithmetic logic unit which, in turn, is connected to an accumulator. The accumulator temporarily stores data from the arithmetic logic unit and output the result onto the data bus. The operations of the signal process are directed by the controller which includes a program memory, an instruction register, and an instruction decoder.

4 Claims, 5 Drawing Sheets

TIMING CHART

DIGITAL SIGNAL PROCESSOR WITH ADDRESSABLE AND SHIFTING MEMORY

This application is a continuation-in-part of application Ser. No. 921,151, filed Oct. 21, 1984, now abandoned.

BACKGROUND OF THE INVENTION

1. Field of the Invention

The present invention relates to a digital signal processor and particularly to a digital signal processor improved so that digital signal processing can be performed efficiently.

2. Description of the Prior Art

A digital signal processor is a microprocessor dedicated to digital signal processing, developed for the purpose of rapidly performing multiplication and addition operations frequently required for digital signal processing.

FIG. 1 is a schematic block diagram showing an example of a conventional digital signal processor disclosed for example in "A Single-Chip Digital Signal Processor for Voiceband Applications" by Y. Kawakami et al, 1980 IEEE International Solid-State Circuits Conference, pp. 40–41. Referring to FIG. 1, this conventional digital signal processor comprises, as in an ordinary microcomputer, a memory portion 1, a control portion 2, an arithmetic operation portion 3 and a data bus 4. The memory portion 1 comprises a random access memory (referred to hereinafter as a RAM) 11 and a read only memory (referred to hereinafter as a ROM) 12. Data to be processed in the arithmetic operation portion 3 and data necessary for this processing are stored in the RAM 11 and the ROM 12. Non fixed data is stored in the RAM 11 and fixed data (such as constant data for multiplication) is stored in the ROM 12. The RAM 11 and the ROM 12 are connected with the data bus 4.

The control portion 2 comprises an instruction ROM 21, a program counter 22, an instruction resistor 23 and an instruction decoder 24. Program data is stored in the instruction ROM 21. The program counter 22 reads out successively program data from the instruction ROM 21 in synchronism with a basic clock (not shown) of the digital signal processor. The instruction resistor 23 stores temporarily the program data read out from the instruction ROM 21. An output from the instruction resistor 23 is supplied to the instruction decoder 24. Part of bit output from the instruction resistor 23 is supplied to the data bus 4. The instruction decoder 24 decodes the program data received from the instruction resistor 23 and provides various control signals. Those control signals are supplied to the memory portion 1, the control portion 2, the arithmetic operation portion 3 etc. so as to control the operation of the internal circuits of those components.

The calculating portion 3 comprises a multiplier 31, an arithmetic and logic unit (referred to hereinafter as an ALU) 32 and an accumulator 33. Inputs of the multiplier 31 are connected with the data bus 4. One of the inputs of the multiplier 31 is connected directly with the RAM 11 and the other input thereof is connected directly with the ROM 12. An input of the ALU 32 is connected with the data bus 4 and is also connected directly with the multiplier 31. The other input of the ALU 32 receives an output from the accumulator 33. An output from the ALU 32 is supplied to the accumulator 33. The accumulator 33 is connected with the data bus 4.

In the above described construction, the multiplier 31 multiplies a value read out from the RAM 11 by a constant read out from the ROM 12 and supplies the result to the ALU 32. The ALU 32 adds the result of multiplication by the multiplier 31 to the accumulating total value of the results of multiplications performed so far and stored in the accumulator 33 and stores the result of addition in the accumulator 33. The accumulating total value stored in the accumulator 33 is provided through the data bus 4.

Since the digital signal processor comprises the multiplier 31 as a hardware circuit dedicated to multiplication processing as described above, multiplication processing can be performed at a higher speed compared with the case in which multiplication is performed in the ALU 32 as repetition of addition as in a conventional microcomputer. In addition, since the multiplier 31 is connected directly with the RAM 11 and the ROM 12, data can be set in the multiplier 31 by one instruction. Furthermore, since the multiplier 31 is connected directly with the ALU 32, a result of multiplication can be set in the ALU 3 by one instruction. Thus, the data paths for multiplication and addition operations are provided separately from the data bus 4 and accordingly multiplication and addition operations and transfer of data can be performed simultaneously and processing for multiplication and addition operations can be performed at high speed.

In such a conventional digital signal processor as described above, data to be multiplied is stored in the RAM 11 and as a result there is involved a problem that several instructions are required for execution of processing to delay the data (such processing is often required in a digital filter or the like). For example, with regard to the processing for delaying data for one sample, the following instructions are required.

(1) To set an address n in the RAM 11.

(2) To store the content of the address n in the RAM 11 into a first temporary resistor (not shown) and at the same time to increment the address in the RAM 11.

(3) To store the content of the address (n+1) in the RAM 11 into a second temporary resistor (not shown).

(4) To write the content of the first temporary resistor into the address (n+1) in the RAM 11.

As described above, it is necessary in the conventional digital signal processor to save temporarily in the temporary resistor the data stored in the RAM 11 and to write again in the RAM 11 the data saved in the temporary resistor after having incremented the address in the RAM 11. Consequently, in order to make delay for one sample, several instructions are required. Moreover, it is necessary to perform the above described processing for all the data to be delayed for one sample.

SUMMARY OF THE INVENTION

An object of the present invention is to provide a digital signal processor by which delay processing of the data to be multiplied can be performed by an extremely small number of instructions (for example, one instruction).

Briefly stated, the present invention is structured in a manner in which at least either of the first and second storing means provided in a memory portion is formed by a shift register.

According to the present invention, at least either of the first and second storing means provided in a memory portion is formed by a shift register and accordingly data to be multiplied can be delayed only by shifting operation and thus delay processing can be performed by an extremely small number of instructions.

These objects and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
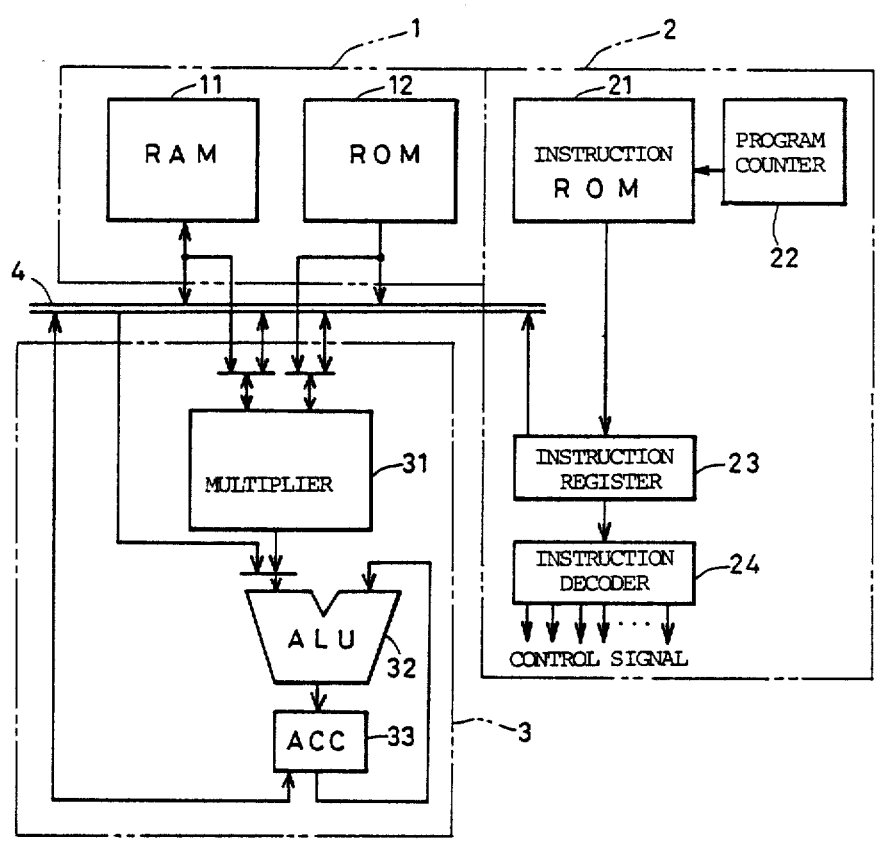
FIG. 1 is a schematic block diagram showing an example of a conventional digital signal processor.
Figure 2:
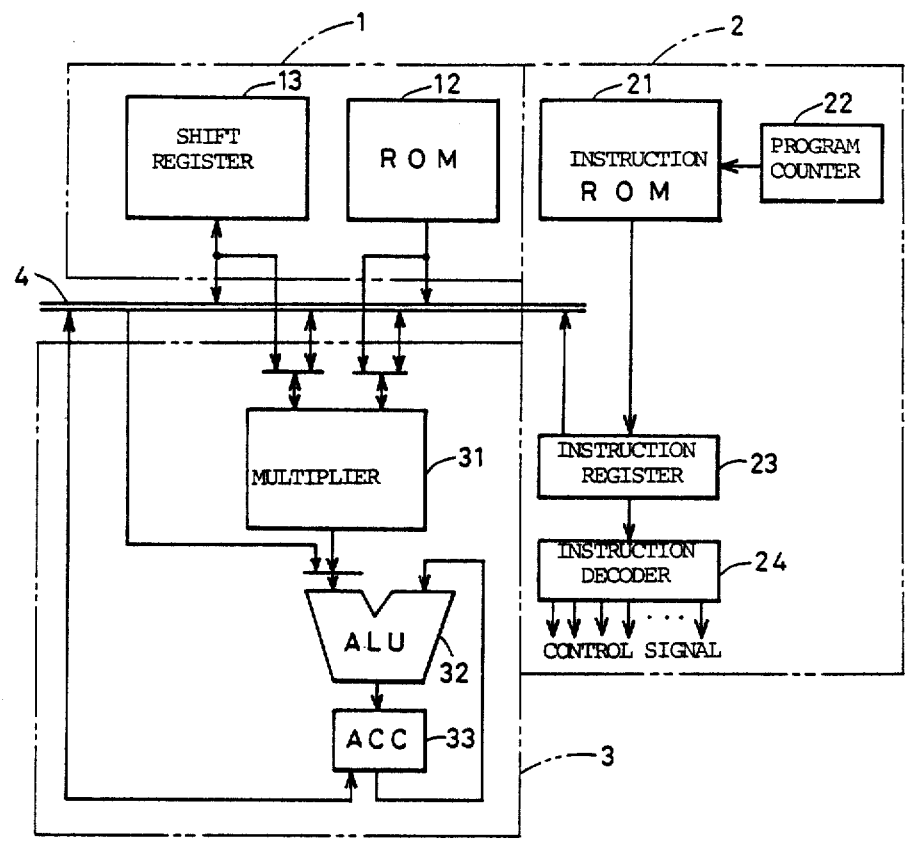
FIG. 2 is a schematic block diagram showing an embodiment of the present invention.

FIG. 2 is a schematic block diagram showing an embodiment of the present invention. Referring to FIG. 2, this embodiment comprises a shift register 13 instead of the RAM 11 shown in FIG. 1. This shift register 13 is adapted to delay input data for one sample time for example. The other construction of this embodiment is the same as the conventional example shown in FIG. 1. Therefore, the same portions as in FIG. 1 are denoted by the same reference numerals and description thereof is omitted.

In the following, operation of the above stated embodiment will be described. Data to be delayed is inputted to the shift register 13. The shift register 13 delays the input data for one sample time by shifting the data. Consequently, in order to delay data to be multiplied in the digital signal processor of this embodiment, delay processing of data can be performed only by one instruction for shifting the data in the shift register 13. In other words, the processing for temporarily saving the data stored in the RAM 11 to write again the data as in the conventional example shown in FIG. 1 is not required and as a result the number of instructions can be reduced. Thus, delay processing of data can be performed efficiently and digital signal processing can be made at high speed.

Figure 3:
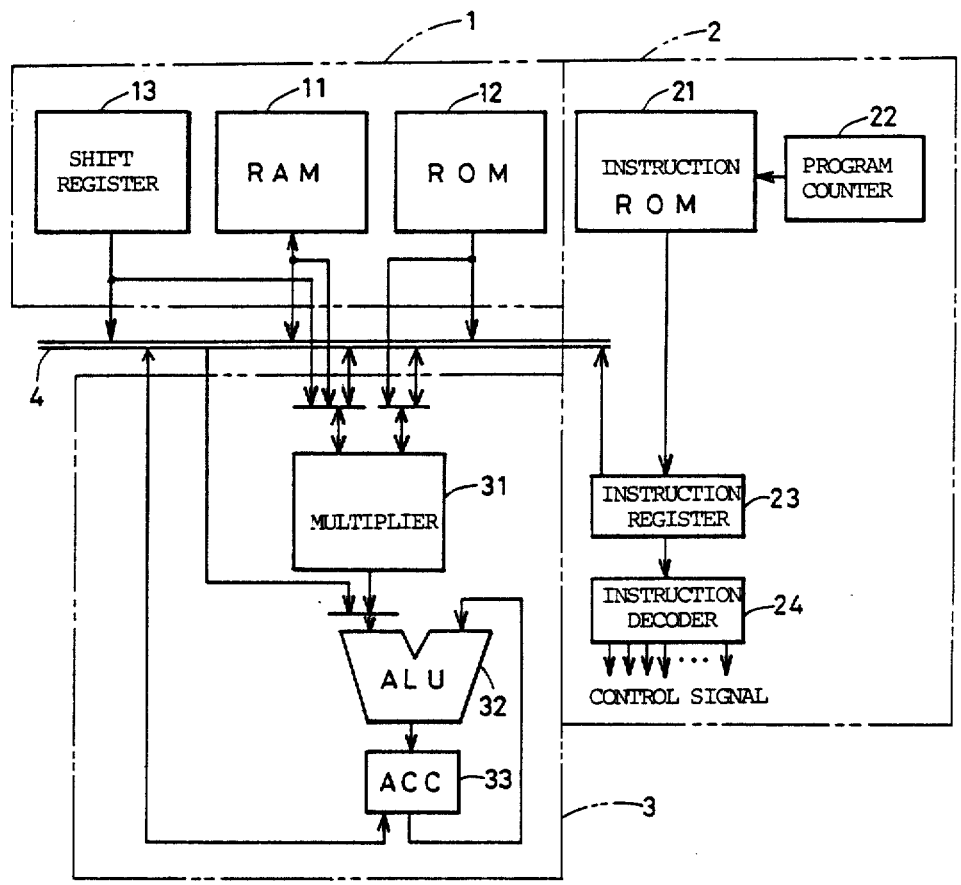
FIG. 3 is a schematic block diagram showing another embodiment of the present invention.

Although the above described embodiment concerns the case in which all the data to be multiplied (excluding the constant data stored in the ROM 12) are to be delayed for one sample time (for example, the case of calculation by the digital filter), if there are many data which do not need to be delayed, a RAM 11 as well as the shift register 13 may be provided in the memory portion 1 as shown in FIG. 3. In the embodiment in FIG. 3, data which need to be delayed are inputted to the shift register 13 and data which do not need to be delayed are stored in the RAM 11. The multiplier 31 is connected directly with both of the shift register 13 and the RAM 11 so that the multiplier 31 can select and receive an output of either of them suitably.

Figure 4:
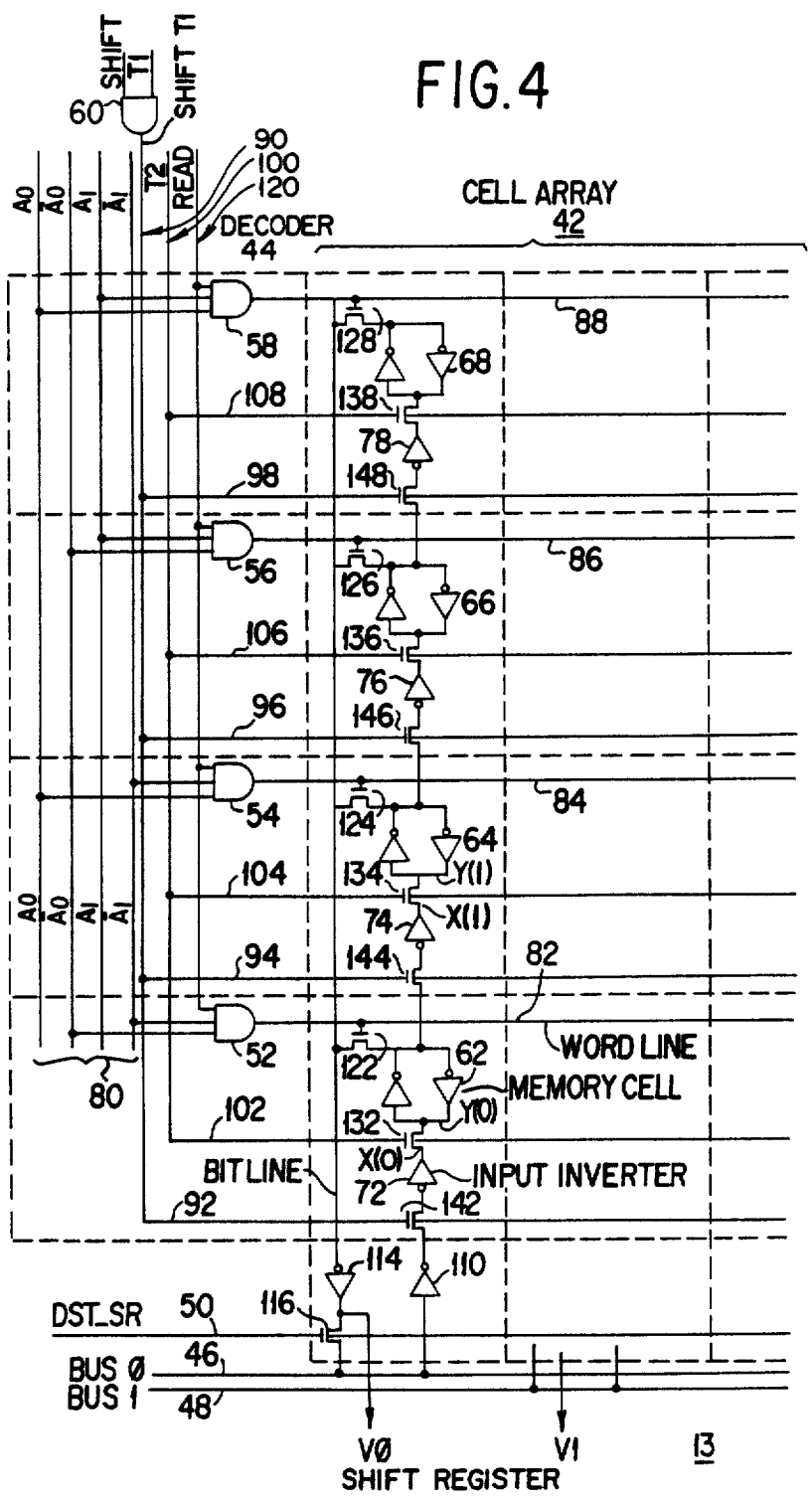
FIG. 4 is a schematic diagram showing the shift register of the present invention.

FIG. 4 is an example of shift register 13 according to the invention, resembling a conventional random access memory for reading of data and further includes shifting means for storing data and for shifting data through the memory. This circuit has the advantage of a single address designated output, avoiding the multiplicity of output lines required by conventional delay lines.

Shift register 13 of FIG. 4 illustrates a four word shift register memory including cell array 42 and read address decoder portion 44. Cell array 42 includes a plurality of memory cells 62-68, each storing a single data bit. Although only a single memory cell 62-68 is shown per word line 82-88, larger word lengths can be accommodated by providing additional memory cells along each word line 82-88, thereby expanding the data width or word size of cell array 42. The inputs of each AND gate 52-58 are connected to address lines 80 to uniquely decode a predetermined address signal designating a particular one of memory cells 62-68 to be read. Each AND gate 52-58 has an additional input connected to READ signal line 120. Responsive to a predetermined address signal on bus 80 in coincidence with a read command signal on READ signal line 120, one of AND gates 52-58 outputs a gating signal onto a corresponding one of word lines 82-88.

The gating signal from an AND gate 52-58 controls a corresponding one of gating switches 122-128 to gate an output from a corresponding one of memory cells 62-68 onto bit line 78 and into an input of inverter 114. The output of inverter 114 is supplied in parallel to multiplier 31 as signal V0 and to switching gate 116. Responsive to control signal DST_SR, the data from the selected cell is gated by gating switch 116 onto bus line 46. Bus line 46 is one of a possible plurality of bus lines, depending on the data width of data bus 4 which bus line 46 comprises. Bus line 48 is additionally shown to accommodate a second column of memory cells, which are not shown. Thus, a second plurality of cells would be selectively gated in parallel onto a second bit line not shown, in response to decoders 52-58. The second bit line would likewise be directly supplied to multiplier 31 and in parallel gated onto bus line 48 in response to clock signal DST_SR. By the foregoing it can be appreciated that in a read mode of operation, shift register 13 functions as a conventional random access memory.

Figure 5:
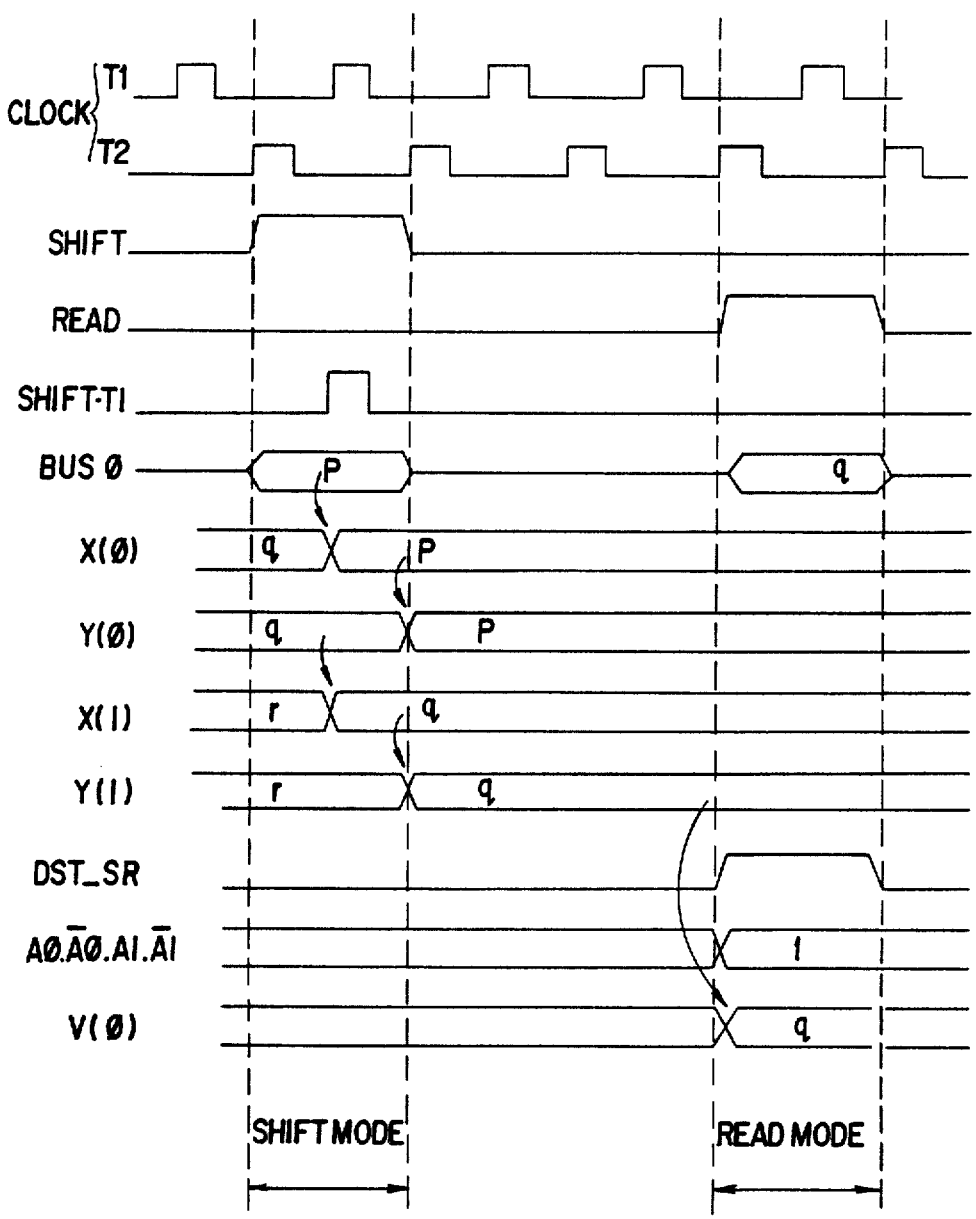
FIG. 5 is a timing diagram for the shift register of FIG. 4.

Data P to be stored in cell array 42 is supplied on data bus 48 to input inverter 110. Referring to FIG. 5, data to be input into shift register 13 is represented by the letter "P" and data previously stored in the first memory cell 62 is designated by the letter "q". Upon clock signal T2 transitioning to a high level, the output of each memory cell input inverter 72-78 is gated through respective switching gates 132-138 into the respective memory cell 62-68. IN the absence of any shift signal, each memory cell 62-68 retains any previously stored data. Upon initiation of a shift signal at an input of AND gate 60 occurring in coincidence with clock signal T1, AND gate 60 generates a logic signal output onto shift line 90 and branch shift lines 92-98. The shift signal causes input data P from cell array input inverter 110 and bus 46 to be supplied through switching gate 142 to first memory cell input inverter 70. Any data state q previously stored in memory cell 62 is gated by switching gate 134 into memory cell input inverter 74. In FIG. 5 this is shown by an arrow between line Y(0) and X(1), indicating that the logic state q is transmitted to point X(I). Likewise, data stored in memory cells 64 and 66 is respectively shifted up into input inverter 76 and 78 corresponding with the next memory cell 66 and 68, respectively. Any data shifted out of a last memory cell 68 is lost, although such data can instead be made available at an output not shown.

Upon the occurrence of the next T2 clock pulse, the output of each of memory cell input inverters 72-78 is stored in the associated memory cell 62-68, respectively, completing a shift operation. Thus, in the shift mode, shift register 13 stores data in accordance with a conventional shift register.

By using a shift register with an addressable read function, the number of output connections required between the memory and multiplier 31 remains equal to the word size. In contrast, a conventional shift register requires separate connections to each memory cell. Thus, if a conventional shift register holds 10 words of 8 bits each, 80 signal lines are required, whereas the shift register 13 requires only 8 signal lines to access and output any number of 8 bit words.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A digital signal processor dedicated to digital signal processing, comprising a memory portion, a control portion, an arithmetic operation portion and a data bus serving as a data transmission line among said memory portion, said control portion and said arithmetic operation portion, said memory portion comprising:
   first storing means for storing part of first data to be multiplied, and
   second storing means for storing second data to be multiplied with said first data,
at least one of said first and second storing means being formed by shift register means comprising pluralities of sequentially addressable memory cells, each for storing a fixed length memory data word, address input means for receiving a data word address signal and in response to uniquely decode said address signal for enabling a corresponding one of said pluralities of memory cells containing a particular data word, data input means for storing data in a first one of said pluralities of memory cells, data output means for outputting data from any one of a plurality of memory cells designated by said address input means to said data bus and to a multiplier, and data shifting means of shifting data into said first memory cell and for shifting data out of said first memory cell and through said pluralities of memory cells, said control portion comprising:
   a program memory for storing data,
   reading means for reading out successively said program data stored in said program memory, and
   means for providing to said memory, control and arithmetic operation portions respective control signals based on said program data read out from said program memory, and further including means for supplying a data word address signal to said address input means of said memory portion, said arithmetic operation portion comprising:
   said multiplier connected directly with said first and second storing means for multiplying data provided from said first storing means by data provided from said second storing means,
   an arithmetic logic unit connected directly with said multiplier, and
   an accumulator for storing temporarily an output of said arithmetic and logic unit, so that said output is supplied to said data bus.

2. A digital signal processor in accordance with claim 1, wherein said shift register means performs delay processing of said data to be multiplied, by one instruction.

3. A digital signal processor in accordance with claim 1, wherein
   either of said first and second storing means is formed by said shift register means and the other is formed by a read only memory for storing fixed data.

4. A digital signal processor in accordance with claim 1, wherein
   either of said first and second storing means is formed by said shift register means and a random access memory, and the other is formed by a read only memory for storing fixed data.

* * * * *

UNITED STATES PATENT AND TRADEMARK OFFICE
CERTIFICATE OF CORRECTION

PATENT NO. : 4,811,267
DATED : March 7, 1989
INVENTOR(S) : Hideki Ando et al

It is certified that error appears in the above-identified patent and that said Letters Patent is hereby corrected as shown below:

On the title page, under "Related U.S. Application Data" and column 1, lines 4 and 5 please correct the date (year) as follows:

(63) Continuation-in-part of Ser. No. 921,151, Oct. 21, 1986, abandoned.

Signed and Sealed this

Fifth Day of December, 1989

Attest:

JEFFREY M. SAMUELS

Attesting Officer     Acting Commissioner of Patents and Trademarks